United States Patent
Potter et al.

(10) Patent No.: US 6,671,263 B1
(45) Date of Patent: *Dec. 30, 2003

(54) MULTIMEDIA CALL HANDLING

(75) Inventors: John M. M Potter, Ipswich (GB); Russell J Lang, Mount Waverley (AU); Stewart R Witchalls, Salford (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,730
(22) PCT Filed: Jul. 13, 1998
(86) PCT No.: PCT/GB98/02051
§ 371 (c)(1), (2), (4) Date: Aug. 25, 1998
(87) PCT Pub. No.: WO99/04547
PCT Pub. Date: Jan. 28, 1999

(30) Foreign Application Priority Data

Jul. 15, 1997 (EP) .............................................. 97305250

(51) Int. Cl.[7] ............................................... H04L 12/16
(52) U.S. Cl. ....................................... 370/261; 370/401
(58) Field of Search ................................. 370/397–399, 370/395.2, 401–409, 438, 352, 410, 260, 261, 262, 263, 264, 265

(56) References Cited

U.S. PATENT DOCUMENTS

| | | | | |
|---|---|---|---|---|
| 5,473,677 A | * | 12/1995 | D'Amato et al. | 379/114.28 |
| 5,625,407 A | * | 4/1997 | Biggs et al. | 370/260 |
| 5,991,301 A | * | 11/1999 | Christie | 370/410 |
| 6,026,087 A | * | 2/2000 | Mirashrafi et al. | 370/401 |
| 6,031,836 A | * | 2/2000 | Haserodt | 370/401 |
| 6,144,671 A | * | 11/2000 | Perinpanathan et al. | 370/409 |
| 6,181,703 B1 | * | 1/2001 | Christie et al. | 370/410 |

OTHER PUBLICATIONS

Thom, Gary A., "H.323: The Multimedia Communications Standard for Local Area Networks", IEEE Communications, Dec. 1996.*

* cited by examiner

Primary Examiner—Chau Nguyen
Assistant Examiner—Soon-Dong Hyun
(74) Attorney, Agent, or Firm—Nixon & Vanderhye P.C.

(57) ABSTRACT

A multimedia telecommunications call centre receives incoming calls via a gateway, which transmits the call request to a multipoint controller. The multipoint controller controls call routing to a desired terminal on a network, with the physical call datastream being carried directly across the network without mediation by the multipoint controller, thereby obviating bottlenecks at the controller and providing scalability.

21 Claims, 7 Drawing Sheets

MULTIMEDIA CALL HANDLING

BACKGROUND OF THE INVENTION

1. Field of the Invention

The present invention relates to a multimedia call handling, more particularly but not exclusively to multimedia call handling in the network and in a telecommunications call centre, and in particular although not exclusively to such a call centre which is capable of handling in an integrated way not only standard telephony services but also communications carrying data and/or video information.

2. Description of Related Art

In a typical prior art call centre, incoming calls are first directed to an automatic call distributor (ACD). This strips off the calling line ID from the incoming call and, with the aid of an intelligent interface, arranges for the call to be routed across a LAN or WAN, to the most appropriate person within the call centre domain. The ACD may be capable of dealing not only with standard (voice) telephony, but also ISDN services. Typically, in incoming voice message will be automatically switched to an appropriate standard telephone, or to a voice mail unit, or to an interactive voice response (IVR) unit. Similarly, incoming ISDN calls may be directed to an appropriate ISDN phone, or to a VC-8000 terminal, allowing video conferencing.

Such a prior art system is technically complex, since the ACD has to interface with a large number of different devices, each making use of different protocols. In some prior art call centres, the ACD may have to handle audio, video, data and telephony services. This complexity causes difficulties, not only in setting up such a system initially, but also in the expansion of such systems, for example when the organisation in question requires more terminals or additional services. The maintenance of such a system requires the use of relatively skilled personnel.

An alternative more rationalised approach is described in our co-pending PCT patent application no GB97/02782, (Publication No WO98/17048). This discloses a call centre using a distributed approach to provide, for the first time, the capability of achieving integrated video, audio data and telephony functionality within the call centre environment, together with the possibility of connectivity to the Internet, ISDN, PSTN and other wide-area networks.

While such an approach works well in practice, it does require a certain defined level of functionality for the individual call centre terminals. Such an approach may not, therefore, be desirable where an organisation intending to set up a call centre has already made a significant investment in incompatible terminals.

While call centers as such usually include funtionally and call control close to the terminal environment, in certain circumstances the level of intelligence required at the call controller may require substantial investment in high level processing capability. Thus it may also be desirable for some funtionality of call centres to be provided in a more centralised manner while not increasing the multimedia traffic load on the main network.

BRIEF SUMMARY OF THE INVENTION

According to one aspect of the present invention there is provided a multimedia telecommunications call centre comprising a computer network arranged to carry addressed multimedia calls, a first terminal, a second terminal and a multipoint controller, the multipoint controller being arranged to control the setting up of a logical call control channel between the first and second terminals, thereby permitting a multimedia call to be made from the first to the second terminal, characterised in that a call physical datastream is then carried from the first to the second terminal directly across the network without mediation by the multipoint controller.

While the terms multipoint controller and multipoint control unit are defined in certain telecommunication Standards as having a specific meaning, the terms as used herein should not be considered to be limited by that definition but rather in the context of this specification as including a virtual switch operating to set up multimedia channels on a physical network.

The fact that the physical data/media stream passes across the network without mediation, interception or interruption by the multipoint controller or virtual switch, avoids what could otherwise represent a switching bottleneck. In addition, such an approach provides improved scalability.

In the present specification and claims, the term "multimedia" refers to a device which is capable of dealing with one or more (and preferably two or more) of the following types of call: standard audio (voice) calls, video and data. The data functionality may, but need not, comply with the Data Conferencing Standard T.120 of the International Telecommunication Union.

Preferably, the multipoint controller acts to control all routing from an initiating terminal to one of a plurality of possible recipient terminals. Since it is the multipoint controller that controls the routing, rather than the terminals themselves, the terminals do not require complex functionality. In particular, there is no requirement for the terminals to support any call transfer functionality. Since the multipoint controller handles only the call control aspects (for example by defining which terminal addresses are to be connected together), scalability will not generally be a problem; the multipoint controller does not handle the physical connections, and therefore does not need to deal with transfer or switching of the physical data/media streams themselves.

Preferably, call routing is effected by defining a logical call control channel from the first terminal to the multipoint controller, and then from the multipoint controller to the second terminal. All calls may be terminated by the multipoint controller, and not by the individual terminals.

Preferably, the call centre and all the terminals connected to it are H.323 compliant; in other words, they comply with the International Telecommunication Union (ITU) H.323 standard protocol. Routing control between the terminals is mediated by the multipoint controller according to the ITU H.245 standard protocol.

If three-way calls or conference calls are required, a multipoint processor may be provided. This provides for the centralised processing of audio, video and/or datastreams within the multipoint conference, either by mixing or by switching.

The present invention, in one preferred forms, provides the possibility, for the first time; of achieving the goal of scalability in an H.323 call centre environment.

The invention further extends to a method of transmitting multimedia calls within a call centre environment as specified by the apparatus set out above and/or as described in the specific description and the claims.

According to another aspect of the present invention there is provided a multimedia call handling environment including a network layer having a multiplicity of nodes and at least a plurality of terminals each connected to a respective one of said nodes, an access manager responsive to requests from the terminals to effect activation of instances of call control to handle each such request, said instances of call control setting up of a logical call control channel between first and second ones of said terminals, thereby permitting a multimedia call to be made from the first to the second terminal, characterised in that a call physical datastream is then carried from the first to the second terminal directly across the network without mediation by the multipoint controller. Preferably call control instances may communicate with a service control point, the service control point comprising processing means and a data store such that substantially greater call control functionality may be performed centrally for multiple call control instances.

BRIEF DESCRIPTION OF THE DRAWINGS

The invention may be carried into practice in a number of ways and a preferred multimedia call centre embodying the invention will now be described with reference to the accompanying drawings in which.

DETAILED DESCRIPTION EXEMPLARY EMBODIMENTS

Figure 1:
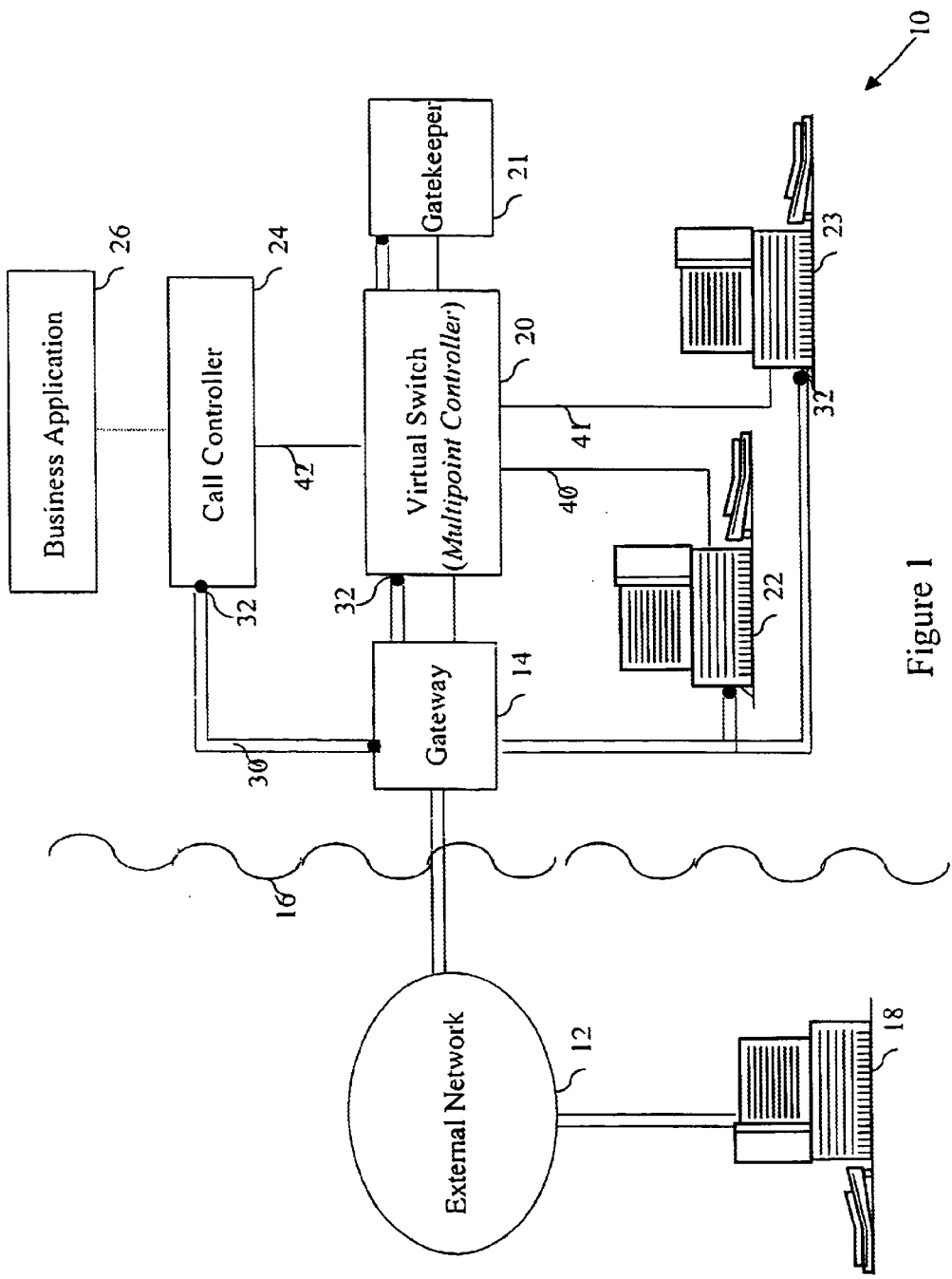
FIG. 1 shows a multimedia call centre according to a preferred embodiment of the present invention.

A multimedia call centre in accordance with the preferred embodiment of the present invention is shown schematically in FIG. 1. The telephony and computer equipment of an individual organisation, illustrated generally by the reference numeral 10, is coupled with an external network 12, for example the public telephone network or the Internet, via a gateway 14. The equipment owned by the organisation is delimited in the Figure from the external network 12 by the wavy line 16. It is to be understood that the equipment to the right of that line will normally be privately owned, although it need not necessarily all reside in one building or indeed even at one site. For large organisations, the privately owned equipment may be spread across several sites, and perhaps in several different countries, with the elements being linked by an appropriate private telephony and/or computer network. In this description, anything to the right of the wavy line 16 will be referred to as being in the "call centre domain".

The typical call centre shown in FIG. 1 comprises a physical LAN 30 (shown in double lines) having a plurality of nodes 32. Some of the nodes define terminals 22,23, while others define respectively a call controller 24, a gateway 14, a multipoint controller (MC) or virtual switch 20 and a gatekeeper 21.

An incoming call from a terminal 18 on the external network 12 arrives at the gateway 14, which then makes a request of the gatekeeper 21 to enquire whether the call may be placed onto the LAN 30. If the gatekeeper grants permission, the virtual switch 20 opens a logical call control channel 40 with an appropriate recipient terminal 22. Once the logical call control channel has been opened and properly set up, the physical datastream representative of the call is then routed directly across the LAN 30 to the terminal 22 without any further mediation, interruption or interception by the virtual switch.

The virtual switch 20 is itself controlled by a call controller 24 which may reside on a separate node of the LAN 30. The logical control channel between the call controller 24 and the switch 20 is shown schematically by the single line 42. The call controller 24 operates according to the requirements of the specific business application 26; this will generally be embodied within a computer program running on the computer which hosts the call controller 24.

The purpose of the gatekeeper 21 is to act as a "policeman" or bandwidth manager, to protect the LAN 30 against a large number of calls (particularly video calls) being placed at once. The gatekeeper may also provide the lookup table between the addressing scheme used by the LAN 30 and that used by the external network 12.

Communications between the gatekeeper 21 and the call controller 24 take place across the LAN 30, preferably in accordance with the CSTA standard protocol of the European Computer Manufacturers Association. Communications between the gateway 14 and the gatekeeper 21 also take place across the LAN 30, this time preferably in accordance with the International Telecommunication Union H.323 standard protocol as defined by the ITU recommendation of May 28, 1996, entitled "Visual telephone systems and equipment for local area networks which provide a non-guaranteed quality of service". The virtual switch 20 may handle routing control with the terminals 22,23 by means of the standard H.245 protocol as defined by the International Telecommunication Union, Recommendation Version 2 dated Jun. 4, 1996, entitled "Control Protocol for Multimedia Communication". Communications between terminals 22, 23 across the LAN 30 may use any appropriate protocol, for example TCP/IP. The LAN 30 itself may be of any convenient type, and topology, such as for example an Ethernet or a Token Ring network.

Figure 2:
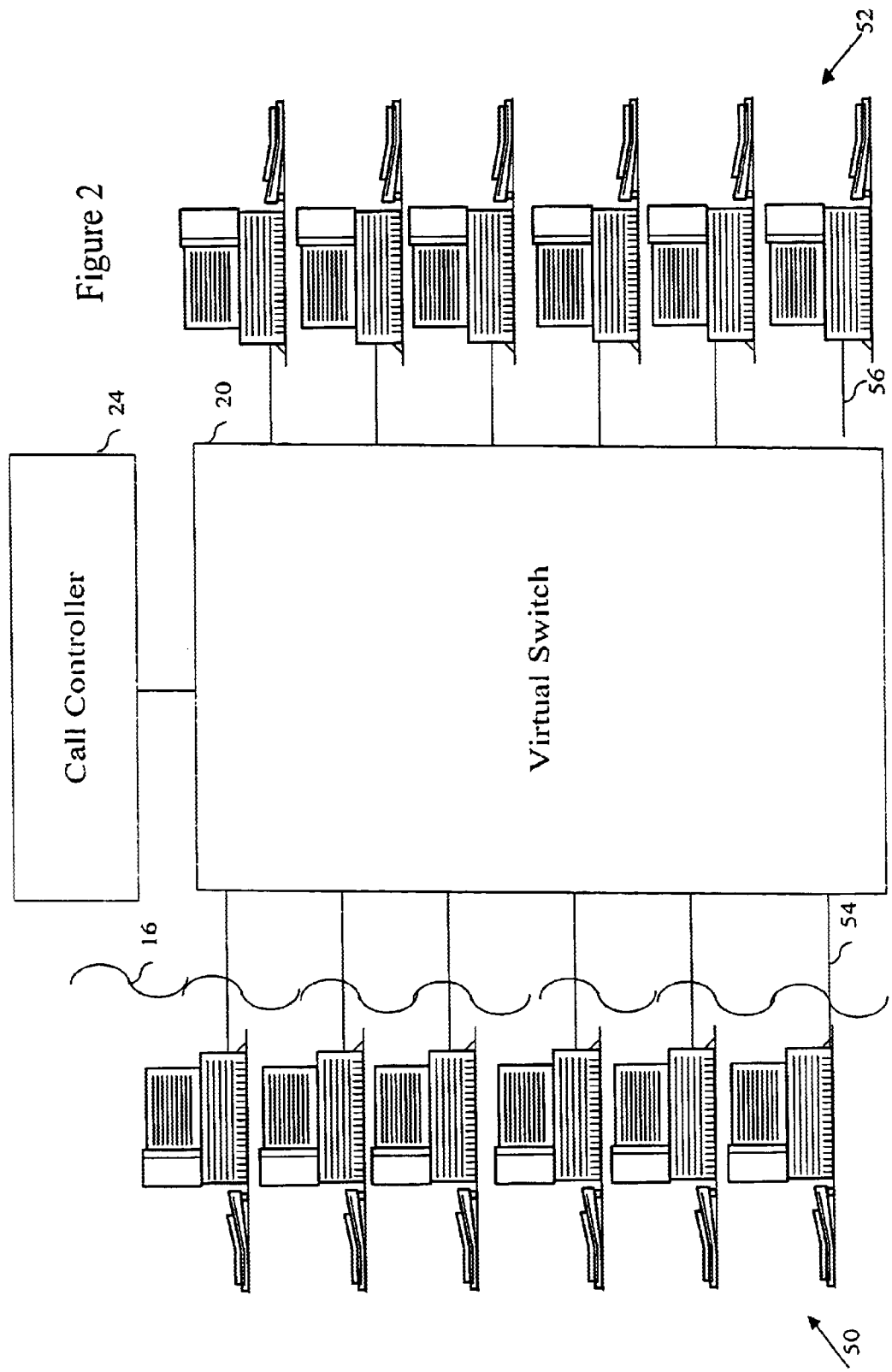
FIG. 2 illustrates schematically the central role of the multipoint control unit.

Since in this embodiment the gateway 14 and the gatekeeper 21 effectively act together as a virtual PBX (Private Branch Exchange), the gateway and the gatekeeper need to take on additional functionality, such as call queuing, under control of the business application 26. FIG. 2 illustrates schematically the central role of the multipoint controller/virtual switch 20 in effecting logical connections between a plurality of external terminals 50 and a plurality of internal terminals 52, within the call centre domain, all under control of the call controller 24. It should be understood that FIG. 2 illustrates the virtual or logical domain (e.g. H.245), and not the actual physical connections along which the physical datastreams will actually flow. Within this logical domain, the multipoint controller 20 is effectively acting as a crosspoint switch between a plurality of logical call control channels 54 connected to the outside world and a plurality of logical call control channels 56 connected to the call centre terminals.

Figure 3:
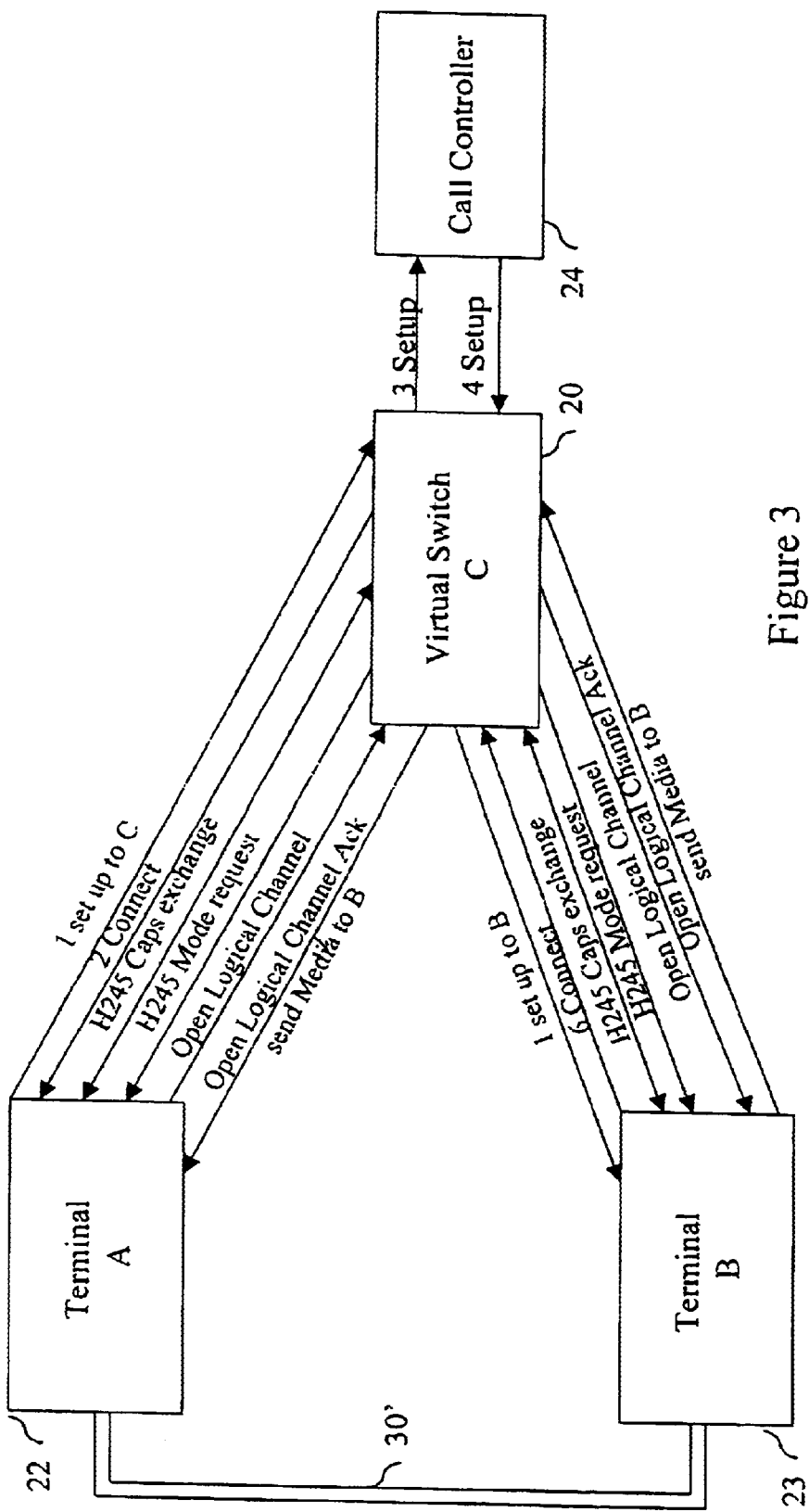
FIG. 3 illustrates the signal flows involved in setting up a multimedia call between two terminals.

Although the logical/addressing channels are controlled by the multipoint controller the controller does not handle the physical media or datastreams. The distinction is illustrated in FIG. 3 which shows the signalling protocol required to set up a call from one terminal 22 on the network to another terminal 23. As may be seen from a comparison with FIG. 1, the virtual switch 20 can communicate with the first terminal 22 via the logical call control channel 40, and with the second terminal 23 via a logical call control channel 41. It will be understood, of course, that at the physical level the signalling is actually all transferred via the LAN 30. The terminals 22,23 are physically connected by a link 30' of the LAN 30. For ease of description, the terminal 22 will be referred to as A, the terminal 23 as B and the virtual switch 20 as C.

First, A sends a Setup request to C, which returns a Connect signal back to A to confirm receipt. C then sends a Setup request to the Call Controller 24, which returns a Setup signal back to C, specifying the address of the terminal B to which the call is to be transferred. C then sends a Setup request to B, which returns its own Connect signal back to C.

Next, C communicates both with A and B. This starts with an H.245 capabilities ("Caps") exchange, followed by an H.245 Mode Request from C to each of A and B. An Open Logical Channel signal is then sent from A to C, and from C to B, specifying that it is terminal A that wishes to talk to terminal B. Corresponding Open Logical Channel Acknowledgement Signals are returned from B to C, and then from C to A.

In accordance with the Open Logical Channel Requests, the media (data) stream is now transferred directly across the link 30' from A to B. Once the call has been completed, the Multipoint Controller closes the Logical Channels between A B.

It will be understood that in the scenario of FIG. 3, the Multipoint Controller/Virtual Switch is identifying itself as such to both A and B, to force A and B to obey Mode Requests. This method requires, of course, that the individual terminals can communicate with the switch, but this is a relatively easy requirement for the terminals to satisfy, even if they do not have sufficient functionality to talk directly to each other or to effect call transfers.

Figure 4:
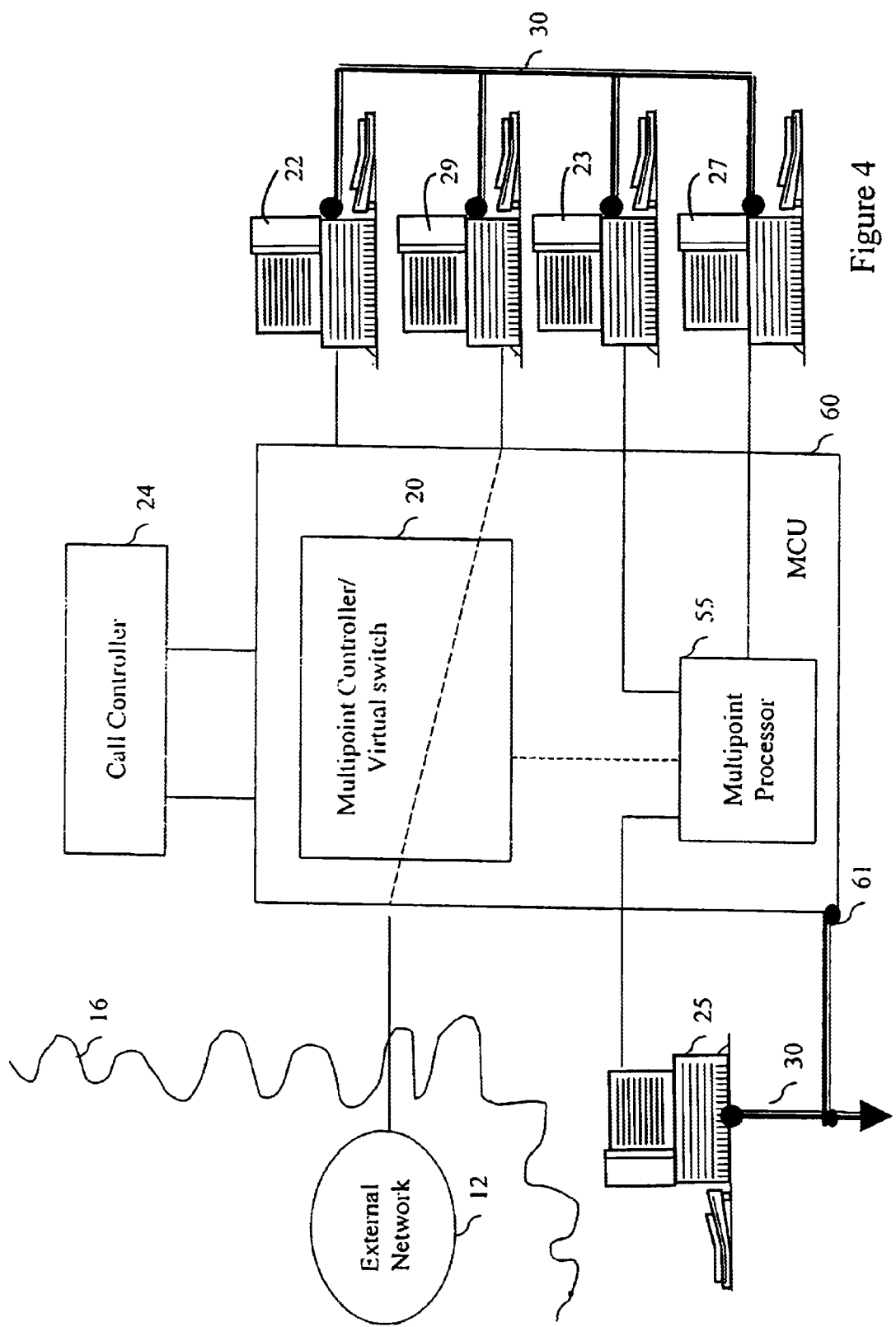
FIG. 4 shows the use of a multipoint processor for three-way calls.

FIG. 4 shows a more complex arrangement including the facility to deal with conference calls having three or more participants. In this variant, the multipoint controller/virtual switch 20 forms part of a multipoint control unit (MCU) 60, which itself defines a node 61 on the LAN 30. In addition to the multipoint controller, the MCU also includes one or more multipoint processors 55 which provide for the centralised processing of audio, video and/or datastreams in a multipoint conference. In the example shown, the multipoint processor connects three terminals 23,25,27 all of which reside on the LAN 30. It would be equally possible, however, for one or more of the participating terminals to reside on the external network 12.

The multipoint processor 55 provides for the mixing, switching or other processing of the physical media streams making up the conference call under the control of the multipoint controller 20. Since the multipoint processor handles the actual media streams, unlike the multipoint controller, it may to some extent represent a limitation on the scalability of the system. If necessary, however, several multipoint processors may be provided within the MCU 60 to handle the expected conference call bandwidth.

Little in the way of functionality is required of the individual terminals, merely that they are capable of communicating with the multipoint controller. However, that does not exclude the possibility of making use of terminals having additional functionality to allow "power dialling". The term "power dialling means that the number to be dialled is selected using the application (eg in software), with the application then dialling the selected number. Even if this additional functionality cannot be provided by the terminals, "power dialling" may nevertheless be achievable provided that auto-answer is available, using the arrangement shown in FIG. 5.

Figure 5:
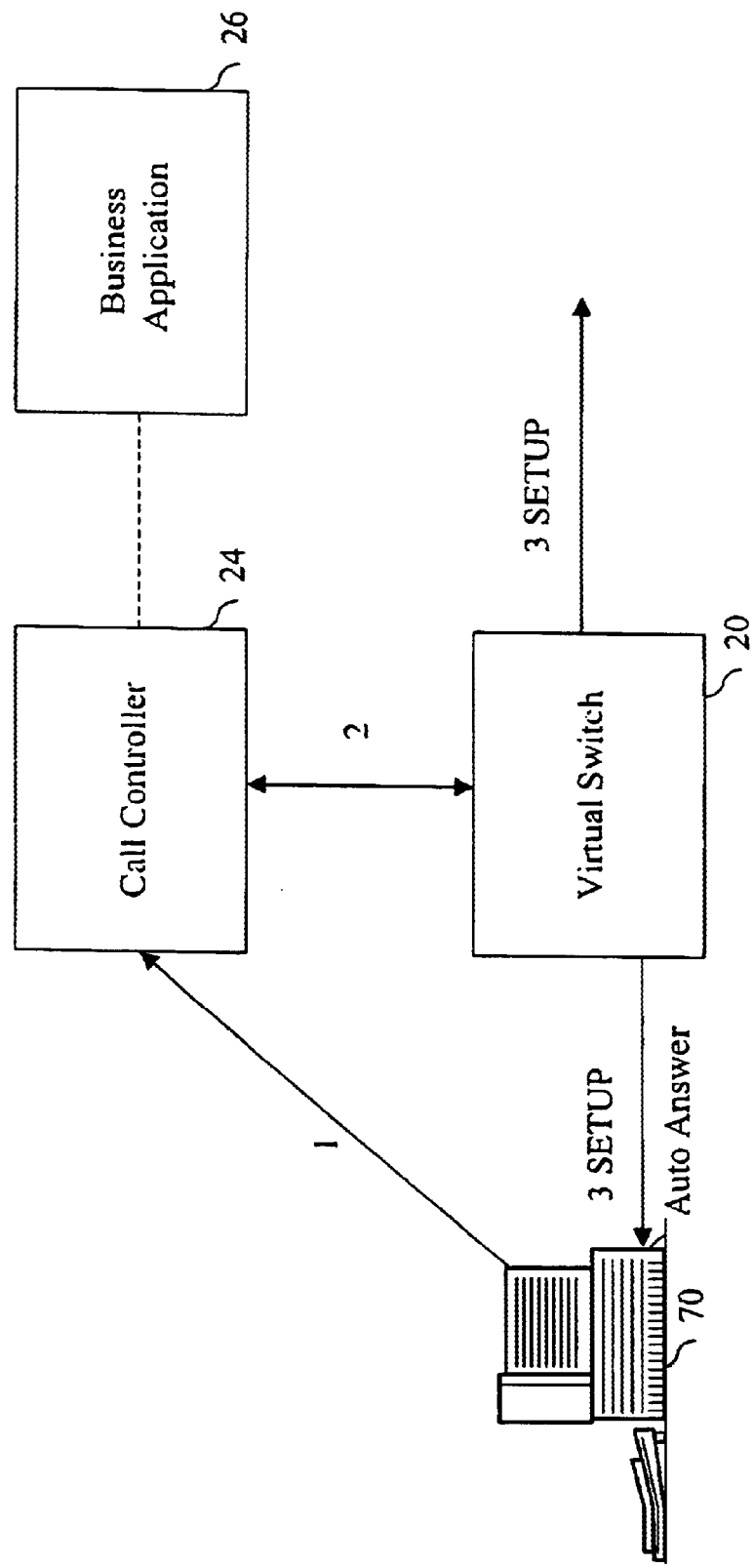
FIG. 5 illustrates one possible approach using a terminal's "auto-answer" facility.

Here, the terminal 70 that wishes to invoke an end-to-end connection first sends a request to the call controller 24, which communicates with the business application 26. The call controller then communicates with the virtual switch 20, and it is the switch which is responsible for sending setup signals both to the original terminal 70 and to the distant end. The setup signal from the multipoint controller to the terminal is received using the terminal's auto-answer facility. A distinction should be made between FIGS. 3 and 5 in as much as in FIG. 3, the setup message is outgoing from terminal A and incoming to terminal B. In FIG. 5, the setup messages are outgoing from the virtual switch and incoming to both terminals.

Using such an approach, the terminal at the distant end receives a setup signal which has apparently been issued from the terminal 70, but has in fact been issued by the virtual switch.

Figure 6:
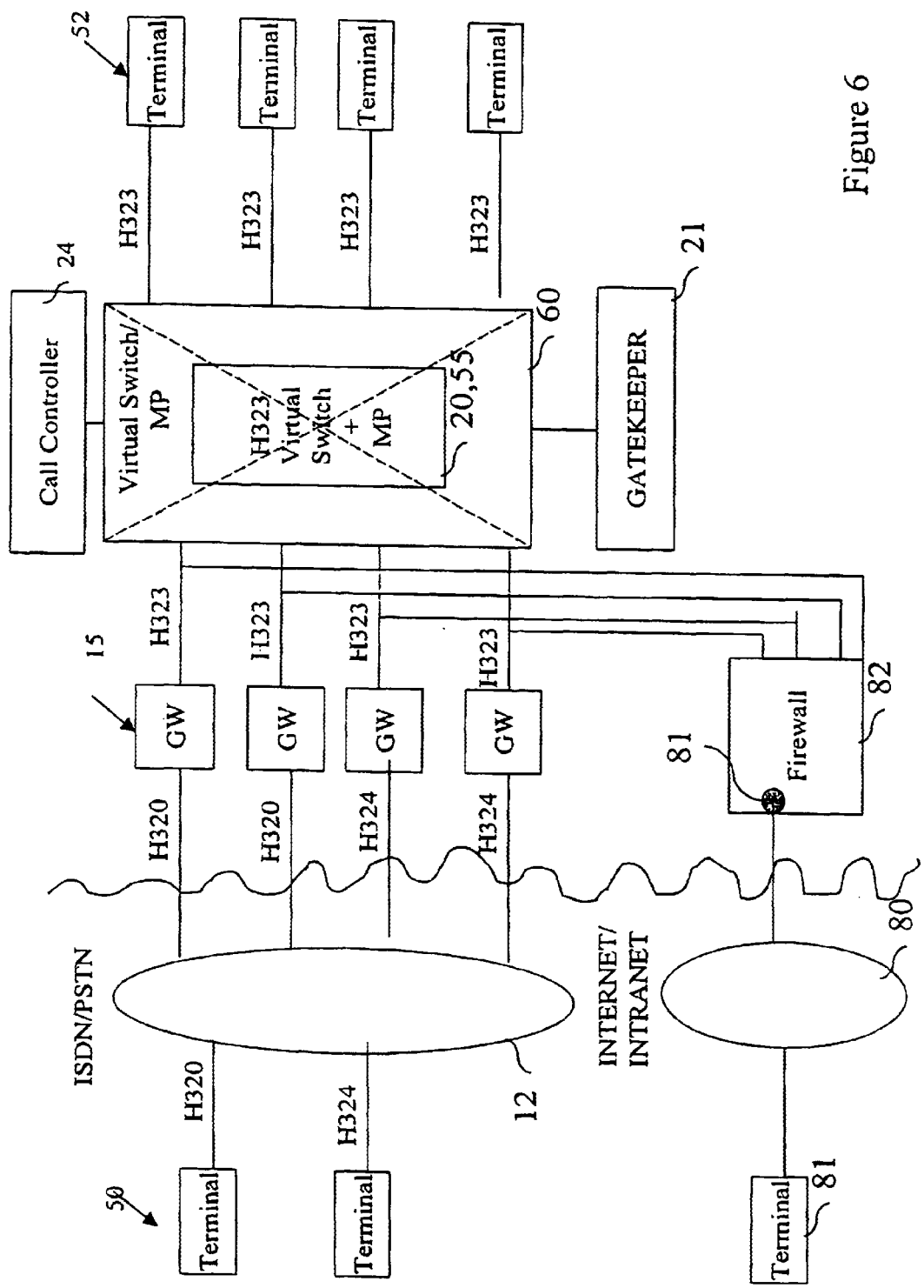
FIG. 6 shows in more detail one specific implementation.

An alternative practical realisation of the embodiment of FIG. 1 is shown in FIG. 6. In this Figure, identical reference numerals are used, where appropriate, and for simplicity only the logical and not the physical connections are shown. The call centre of FIG. 6 is rather more complex, in that it incorporates a variety of different gateways 15, allowing access to the external network 12 via a variety of different protocols, for example the International Telecommunication Union protocols H.320 and H.324. In addition, a dedicated node 81 on the LAN hosts a firewall 82 allowing an external terminal 81 access via the Internet or an external Intranet 80. The firewall 82 is controlled (logical connection not shown) by the call controller 24.

Figure 7:
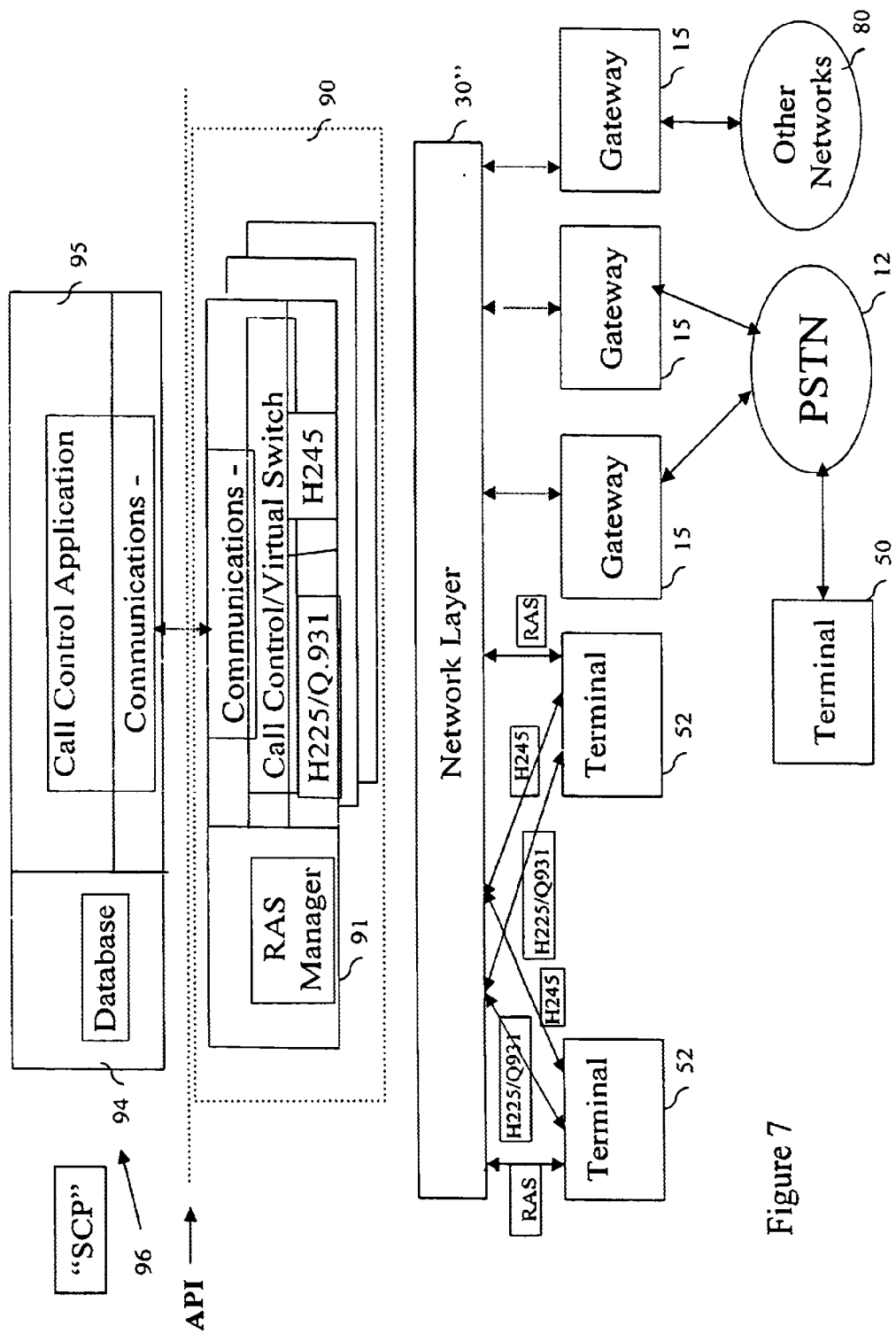
FIG. 7 shows a network implementation of call centre functionality with centralised intelligence.

With such an arrangement, entirely transparent call switching may be provided by the MCU 60 between any of the terminals 50, or the terminal 81, and any of the call centre terminals 52. In a network or service platform based arrangement of the call handling system hereinbefore described, referring now to FIG. 7, each of the terminals 52 has access to one or more nodes in the network transport layer 30" corresponding to the LAN 30 of FIG. 1. Gateways 15 connected to respective nodes of the network transport layer 30" allow access from the PSTN 12 to the call handling system and other nodes may allow access from other networks, for example from the Internet 80.

Now as shown in the drawing, the gatekeeper functionality is handled by a virtual switch controller 90 which has a RAS (registration, admissions and status) manager 91 which communicates via the network nodes with each endpoint attached terminal 52 to effect call control functions. Endpoints are equivalent of nodes in the previously described call centre. The RAS manager co-operates with a call control—virtual switch function which has effective access to high level intelligence for example in the manner provided by service Control Points to Service Switching Points in an intelligent communications network.

Thus on receipt of a request for connection from one of the H323 endpoints (equivalent of gateways), the gatekeeper function within the virtual switch control unit 90 may apply to a call control application 95 in a service control point 96, the call control application using call details appended to a communications message to determine the required connection at the network layer. Instructions are encoded in message form from the high level intelligence at the SCP based on business applications (not shown sepearetly) and using data from a central database 94. These instructions are used by the virtual switch controller to instruct the gateway to set up the required channel on the network such that terminal to terminal communication occurs without media streams passing through the virtual switch control.

Should it be necessary for the incoming multimedia call to be moved to another terminal then the transferring terminal will request a transfer from the virtual switch control by messaging through the RAS manager. Again, switching detail may be requested from the higher level intelligence and this causes the virtual switch control to set up the appropriate channel between the transferring terminal and the transferred to terminal to allow data interchange across the network layer without involving the virtual switch control in the transfer. This occurs in th e same manner as that described with reference to FIG. 3 except that the virtual switch & call control instance started by the RAS Manager 91 uses the SCP 96 to determine the channel to be opened.

What is claimed is:

1. A multimedia telecommunications call centre comprising;

a computer network carrying addressed multimedia calls, a first terminal, a second terminal, and a multipoint controller, the multipoint controller controlling the setting up of a logical call control channel between the first and second terminals by establishing respective logical communication call control channels between the multipoint controller and the first terminal and between the multipoint controller and the second terminal, the controller transmitting set up signals to each of said first and second terminals through said respective logical communication call control channels so that all communications between the first and second terminals during the setting up of the logical call control channel are made through the multipoint controller, thereby permitting a multimedia call to be made from the first terminal to the second terminal, a call physical datastream then being carried from the first terminal to the second terminal directly across the computer network without mediation by the multipoint controller;

wherein one of the first and second terminals comprises a gateway that interfaces between the computer network and an external network during the setting up of a delivery of an addressed multimedia call from the external network to the other of one of the first and second terminals.

2. A call centre as claimed in claim 1 in which at least one of the first and second terminals comprises a node on the computer network.

3. A call centre as claimed in claim 1 in which the multipoint controller comprises a node on the computer network.

4. A call centre as claimed in claim 1 in which the multipoint controller controls the setting up of the logical call control channel by communicating with the first and second terminals via the network.

5. A call centre as claimed in claim 4 in which the multipoint controller communicates with the first and second terminals according to the International Telecommunication Union H.245 standard protocol.

6. A call centre as claimed in claim 4 which the logical call control channel is defined from the first terminal to the multipoint controller, and from the multipoint controller to the second terminal.

7. A call centre as claimed in claim 1 the call centre being H.323-compliant, in accordance with the International Telecommunication Union H.323 standard protocol.

8. A call centre as claimed claim 1 including a multipoint processor for effecting conference calls, the multipoint processor acting under the control of the multipoint controller.

9. A call centre as claimed in claim 1 in which the first and second terminals are multimedia terminals.

10. A call centre as claimed in claim 1 including a call controller for controlling operation of the multipoint controller.

11. A call centre as claimed in claim 10 in which the gateway includes a firewall.

12. A multimedia telecommunications call centre comprising:

a computer network carrying addressed multimedia calls, a first terminal, a second terminal, a multipoint controller, the multipoint controller controlling the setting up of a logical call control channel between the first and second terminals by establishing respective logical communication call control channels between the multipoint controller and the first terminal and between the multipoint controller and the second terminal, the controller transmitting set up signals to each of said first and second terminals through said respective logical communication call control channels so that all communications between the first and second terminals during the setting up of the logical call control channel are made through the multipoint controller, thereby permitting a multimedia call to be made from the first terminal to the second terminal, a call physical datastream then being carried from the first terminal to the second terminal directly across the computer network without mediation by the multipoint controller;

a gateway to the network for receiving multimedia calls for transmission by the network; and a call controller for controlling operation of the multipoint controller and a gateway to the network which receives multimedia calls for transmission by the network in which the firewall is operated under control of the call controller and the gateway includes a firewall.

13. A multimedia telecommunications call centre comprising:

a computer network carrying addressed multimedia calls, a first terminal, a second terminal, a multipoint controller, the multipoint controller controlling the setting up of a logical call control channel between the first and second terminals by establishing respective logical communication call control channels between the multipoint controller and the first terminal and between the multipoint controller and the second terminal, the controller transmitting set up signals to each of said first and second terminals through said respective logical communication call control channels so that all communications between the first and second terminals during the setting up of the logical call control channel are made through the multipoint controller, thereby permitting a multimedia call to be made from the first terminal to the second terminal, a call physical datastream then being carried from the first terminal to the second terminal directly across the computer network without mediation by the multipoint controller;

a call controller for controlling operation of the multipoint controller; and a gateway between the computer network and an external network and a gatekeeper which controls access to the computer network, in which communications between the gateway and the call controller are mediated by the gatekeeper, communications between the gateway and the gatekeeper being effected according to a first protocol, and those between the gatekeeper and the call controller being effected according to a second protocol.

14. A call centre as claimed in claim 1 in which the multipoint controller sends a SETUP signal to a terminal wishing to instigate a multimedia call, the SETUP signal being received via an auto-answer function of the said terminal.

15. A call centre as claimed in claim 1 in which the multipoint controller controls routing of calls from an initiating terminal to any one of a plurality of endpoint terminals on the computer network.

16. A multimedia call handling environment comprising:

a network layer including a multiplicity of nodes and at least a plurality of terminals each connected to a respective one of said nodes, and an access manager responsive to requests from the terminals to effect activation of instances of call control to handle each such request to control setting up of a logical call control channel between first and second ones of said terminals by establishing respective logical communication call control channels between the access manager and the first one of the terminals and between the access manager and the second one of the terminals, the access manager transmitting set up signals to each of the first and second ones of the terminals through the respective logical communication call control channels so that all communications between the first and second ones of the terminals during the setting up of the logical call control channel are made through the access manager, thereby permitting a multimedia call to be made from the first to the second terminal, wherein a call physical datastream is then carried from the first to the second terminal directly across the network layer without mediation by a multipoint controller.

17. A multimedia call handling environment as claimed in claim 16 wherein the environment includes a service control point accessible by each instance of call control, the call control communicating request information to the service control point, the service control point using call control application information responsive to information held in a database to derive call control information for use by the call control instance.

18. A multimedia telecommunications call centre comprising:

a computer network carrying addressed multimedia calls, a first terminal, a second terminal, a multipoint controller, a call controller for controlling the operation of the multipoint controller, and a gateway to the network for receiving multimedia calls for transmission by the network, the gateway including a firewall which operates under control of the call controller, the multipoint controller controlling the setting up of a logical call control channel between the first and second terminals by establishing respective logical call control channels between the multipoint controller and the first terminal and between the multipoint controller and the second terminal, the controller transmitting set up signals to each of said first and second terminals through said respective logical communication call control channels so that all communications between the first and second terminals during the setting up of the logical call control channel are made through the multipoint controller, thereby permitting a multimedia call to be made from the first terminal to the second terminal, a call physical data stream then being carried from the first terminal to the second terminal directly across the computer network without mediation by the multipoint controller.

19. A call centre as claimed in claim 18 in which communications between the gateway and the call controller are mediated by the gatekeeper, communications between the gateway and the gatekeeper being effected according to a first protocol, and those between the gatekeeper and the call controller being effected according to a second protocol.

20. A call centre as claimed in claim 18 in which the multipoint controller is arranged to send a SETUP signal to a terminal wishing to instigate a multimedia call, the SETUP signal being received via an auto-answer function of said terminal.

21. A call centre as claimed in claim 18 in which the multipoint controller is arranged to control routing of calls from an initiating terminal to any one of a plurality of endpoint terminals on the network.

* * * * *